United States Patent

[11] 3,550,958

[72] Inventor Ruben J. Krein
 Highway 69 S., Forest City, Iowa 50436
[21] Appl. No. 762,203
[22] Filed Sept. 16, 1968
[45] Patented Dec. 29, 1970

[54] MOVABLE ARM REST
 10 Claims, 7 Drawing Figs.
[52] U.S. Cl. .................................................. 297/417,
 297/414, 297/403
[51] Int. Cl. ..................................................... A47c 7/54,
 B60n 1/06
[50] Field of Search .......................................... 297/403,
 408, 416, 417, 418; 16/hinges considered

[56] References Cited
UNITED STATES PATENTS
361,528   4/1887  Kazanjian .................... 297/408X
3,368,842 2/1968  Polsky ........................ 297/417

Primary Examiner—Casmir A. Nunberg
Attorney—Burd, Braddock & Bartz

ABSTRACT: A seat having a movable armrest located in a forward position adjacent one side of the back of the seat and movable to a second position adjacent the back side of the back of the seat. An articulated connector mounts one end of the arm to the side frame of the back. The connector has three pivotally related members and releasable locks between the adjacent members to firmly hold the arm in the forward position.

PATENTED DEC 29 1970

INVENTOR.
REUBEN J. KREIN

BY
Burd, MacEachron, Braddock,
Bartz & Schwartz

ATTORNEYS

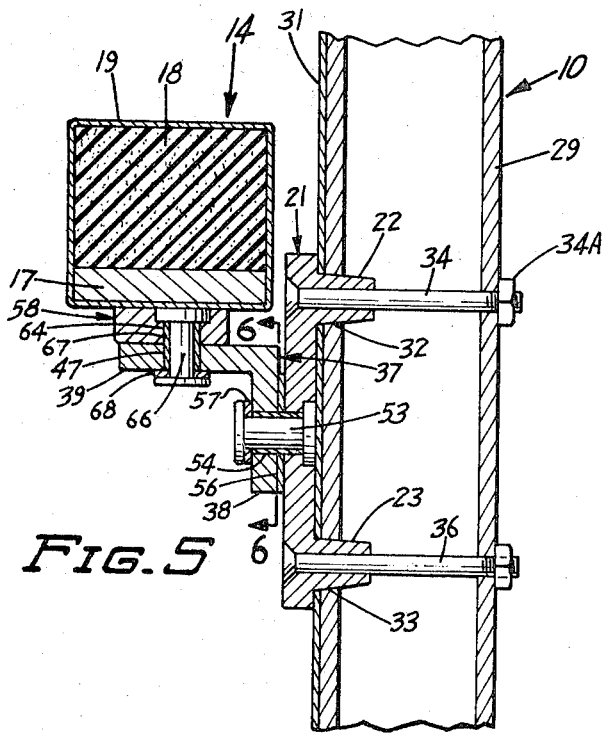

MOVABLE ARM REST

SUMMARY OF INVENTION

The invention relates broadly to an armrest for a seat having a back. The armrest is connected to the chair with an articulated linkage operable to lock the armrest in a forward position and permit the armrest to be pivoted up and folded behind the back side of the seat. The articulated linkage has stops which limit the positions of the arm and eliminate the necessity of using the fabric of the seat as a support or stop. The articulated linkage has three pivotally related members with releasable locks between associated members to firmly hold the arm in the forward position.

IN THE DRAWINGS

FIG. 5 is an enlarged sectional view taken along the line 5-5 of FIG. 1;

FIG. 6 is an enlarged sectional view taken along the line 6-6 of FIG. 5; and

FIG. 7 is an exploded perspective view of the articulated connector coupling the armrest to the seat.

Figure 1:
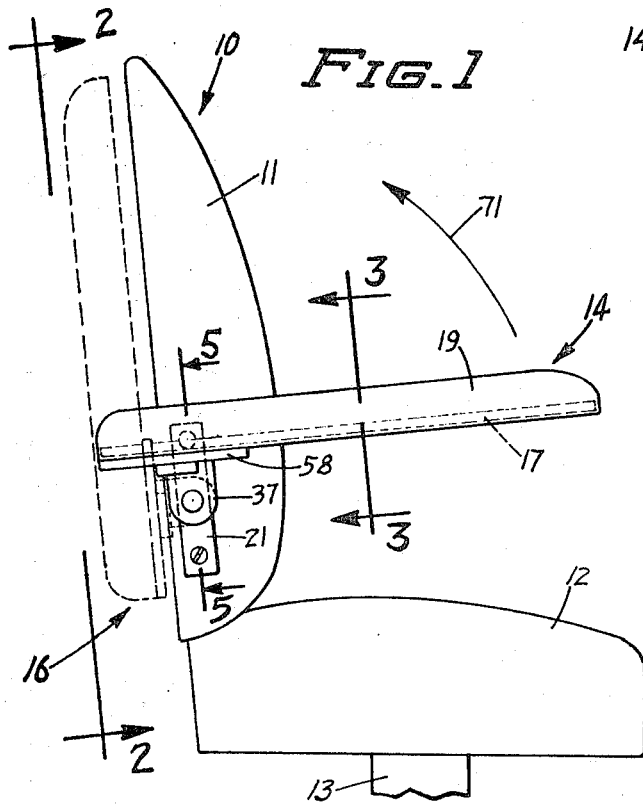
FIG. 1 is a side elevational view of a seat equipped with a movable armrest of the invention in the forward position.

Referring to the drawings there is shown in FIG. 1 a seat indicated generally at 10 having an upright back 11 and a forwardly directed bottom 12. The entire seat is mounted on a support 13. The seat may be a conventional bucket seat used in an automobile, motor home and like vehicles. Movably mounted on the side of back 11 is an armrest indicated generally at 14. An articulated connector or linkage indicated generally at 16 mounts the rear end of armrest 14 to the side of back 11. The articulated connector 16 is the sole support for the armrest 14 and is operable to lock the armrest in the forward position shown in full lines in FIG. 1. To store the armrest behind the back 11 an armrest 14 is initially raised to an upright position as shown in broken lines in FIGS. 1 and 2, and then folded or pivoted behind the back shown in full lines in FIG. 2. In both the forward position and the folded position the articulated connector 16 serves as the sole support and a stop member to limit the pivotal movement of the armrest.

The armrest 14 has an elongated support 17 carrying a cushion or padding 18. A cover of flexible material 19, as fabric, leather or canvas, surrounds both the cushion and support. The length of armrest 14 is slightly shorter than the horizontal extent of the bottom 12.

The articulated connector 16 comprises three pivotally interconnected members used to solely support and hold the armrest 14 in the forward lock position and in the folded storage position as shown in FIGS. 3 to 7, connector 16 has a first plate member 21 which functions as a base plate to connect the connector to the back 11. Projected laterally from opposite end portions of member 21 are tapered bosses 22 and 23. Holes 24 and 26 extend through the plate and bosses accommodate fastening means 34 and 36 used to attach the plate to the back. Member 21 has a central hole 27 located adjacent a lateral stop or projection 28. As shown in FIG. 5, seat 10 has an upright tubular frame covered with a fabric or other covering 31. The frame has a pair of holes 32 and 33 for accommodating the bosses 22 and 23 to relieve the shearing forces on the fastening means. The inside of plate 21 lies against the covering 31. The fastening means shown as bolts 34 and 36 extend through the holes 24 and 26 and are threaded into nuts 34a and 36a respectively to firmly connect the plate to the frame 29 of the back.

Positioned adjacent the midsection of plate 21 is a second right angle member 37 having angularly disposed flanges 38 and 39. As shown in FIG. 6, flange 38 has a centrally located hole 41 located in the corner of a quadrant recess 42. One side of the quadrant recess 42 has a forwardly directed radial groove 43 located adjacent a first shoulder 44 of the recess 42. Normally disposed from the first shoulder 44 is a second shoulder 46 which cooperates with the stop 38 to limit the upward pivotal movement of the second member 37. The second flange 39 has a central hole 47 normally disposed with respect to the hole 41. Hole 47 is located in the corner of a quadrant recess 48. One side of the recess 48 has a radially directed rearward groove 49 located adjacent a first shoulder 51. A second shoulder 52 is normally disposed with respect to the shoulder 51.

Returning to FIG. 5, pivot member 53, as a pin, rivet or bolt or the like, pivotally joins the second member 37 to the first member 21. Member 53 projects through a sleeve bearing 54 positioned in the holes 27 and 41 of the members 21 and 37. A flat bearing washer 56 is interposed between the flange 38 and the plate 21 to minimize the binding and friction between these members. One end of the pivot member 53 is located in a recess in the back side of plate 21 so as not to interfere with the fabric 31. The other end of member 53 is enlarged and bears against an annular compression spring 57 which functions to bias or yieldably urge the flange 37 toward the plate 21. The spring 57 functions as a biasing member to hold the stop projection 28 in the radial groove 43 thereby releasably locking second member with respect to the first member 21.

Returning to FIG. 7, the connector 16 has a third plate member indicated generally at 58 for connecting the armrest 14 to the second member 37. Plate member 58 has a pair of holes 59 and 61 to accommodate fasteners 62 and 63, as screws or bolts, securing the plate member 58 to the rear end of the base support 17 of armrest 14. The center portion of the plate member 58 has a countersunk hole 64 for a pivot member 66, as a pin, rivet or the like. Pivot member 66 movably connects the plate member 58 with the flange 39 of the second member 37. As shown in FIG. 5, a sleeve bearing 67 is interposed in the hole 47 and 64 to provide for free pivotal movement of the member 58 relative to the second member 37. An annular compression spring 68 located between the head of pivot member 66 and the flange 39 yieldably holds the third member 58 in engagement for the top flange 39. Located adjacent the hole 64 is a downwardly directed projection or stop 69. Spring 68 yieldably holds the bottom of the projection in engagement with the bottom of the recess 48.

Figure 3:
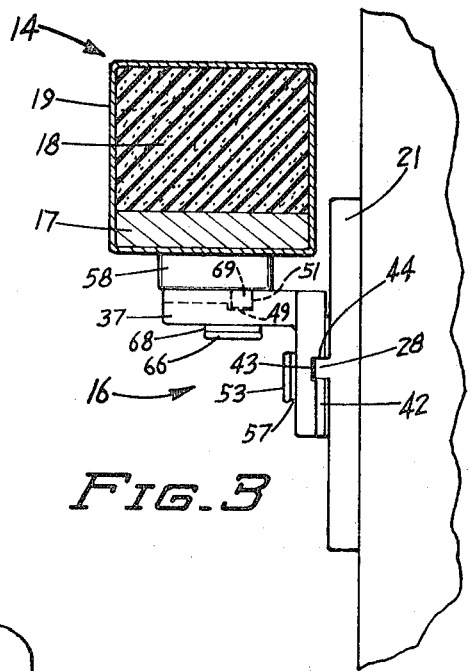
FIG. 3 is an enlarged sectional view taken along the line 3-3 of FIG. 1.

As shown in FIG. 3, when the arm 14 is in the forward position, the projection 69 is located in the radial groove 49 thereby releasably locking the arm in the forward position eliminating free lateral movement of the armrest. With the stop 69 in recess 49 the side of the stop engages the shoulder 51 to prevent outward movement of the armrest. Stop 28 is located in groove 43 to eliminate free upward movement of the armrest. Shoulder 44 acting on stop 28 prevents downward movement of the armrest.

In use with the arm rest in the forward position as shown in full lines in FIG. 1 the second member 37 is locked to the first member 21 and the third member 58 is locked with the second member 37. The second member 37 is pivotally mounted by pivot means 53 to the first member 21 for movement about a horizontal laterally directed axis. The projection 21 is located in the recess 43 and shoulder 44 engages the top of the projection. The annular compression spring 57 yieldably holds the member 37 in the lock position relative to the projection 28. The third member 58 is locked relative to the second member 37. Projection 69 is located in the recess 49 and held there by the biasing action of the annular compression spring 68.

Figure 4:
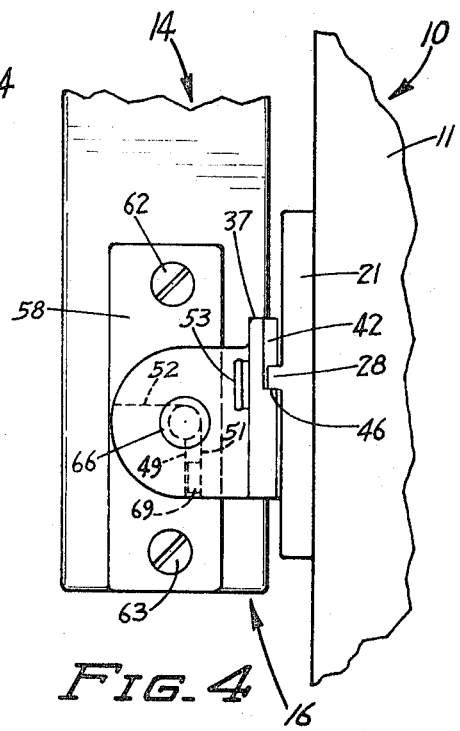
FIG. 4 is a view similar to FIG. 3 with the armrest in the raised position.

To place the armrest 14 behind the seat back 11, the armrest 14 is initially pivoted in an upward direction as indicated by the arrow 71 in FIG. 1 to the broken line position. The armrest pivots about the axis of the pivot member 53 until the projection 28 engages the shoulder 46 as shown in FIG. 4.

Returning to FIG. 2 the armrest 14 is then moved from the upright position shown in broken lines to the folded back position shown in full lines. The armrest 14 pivots about the pivot axis of the pivot member 66 and is held in the horizontal back position by the projection 69 in engagement with the shoulder 52.

Figure 2:
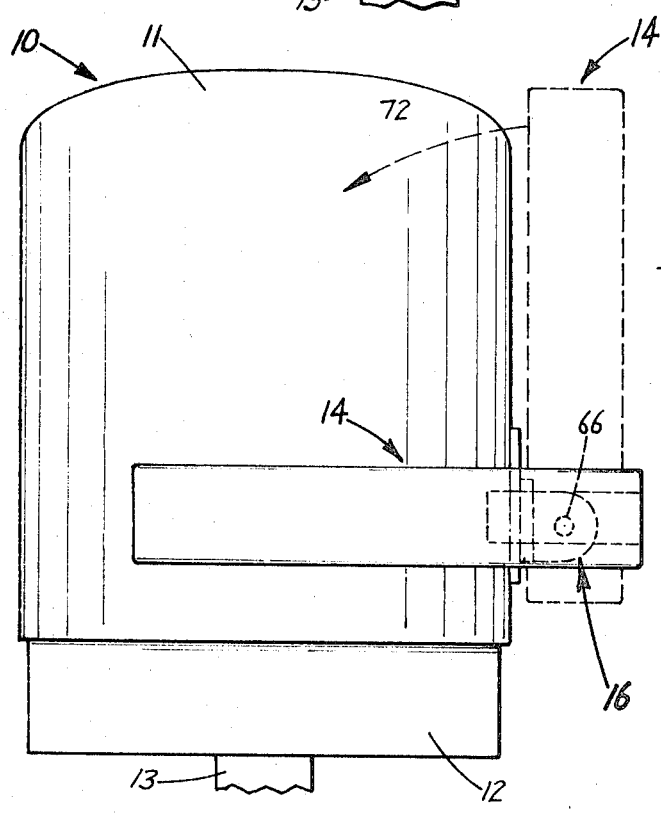
FIG. 2 is a back elevational view of a seat taken along line 2-2 of FIG. 1 with the armrest in the transverse storage position.

In both the forward position shown in FIG. 1 and the folded position shown in FIG. 2 of the armrest 14 all of the supports and stops for the armrest 14 are in the articulated connector 16. The armrest 14 does not bear or stop on the fabric of the seat. All of the weight and force on the armrest is transferred directly to the frame of the chair by the first plate member 21.

I claim:

1. An armrest for a seat having a back and a frame comprising: an elongated arm, an articulated connector mounting the arm on the frame, said connector comprising a first member secured to the frame, a second member having a first side and a second side located generally normal to the first side, first pivot means pivotally connecting the first member on the first side of the second member for movement of the second member about a first generally horizontal axis, a third member, second pivot means pivotally connecting the second side of the second member on the third member for movement about an axis generally normal to said first axis, means attaching the arm to the third member, whereby the arm is selectively and solely supported in a first position extended forwardly from the back and in a second position behind the back.

2. The armrest of claim 1 including a releasable lock associated with the connector to hold the arm in said first position extended forwardly from the back.

3. An armrest for a seat having a back with a frame comprising: an elongated arm, an articulated connector mounting the arm on the frame of the back, said connector comprising a flat first member secured to the frame of the back adjacent one side of the back, a second right-angle member, a means pivotally mounting one portion of the right-angle member to the first member for movement about a horizontal axis extended laterally of the back, a third flat member secured to the arm, a second pivot means mounting the opposite portion of the second member to the third member for pivotal movement about an axis generally normal to the axis of the first pivot member, whereby said connector is operable to selectively and solely support the arm in a first position extended forwardly from the back and in a second position behind the back.

4. The armrest of claim 3 including: a first stop on the first member to cooperate with a shoulder on the right-angle member to hold the right-angle member in a first position; and a second stop on the third member cooperating with a second shoulder on the right-angle member to hold the third member in a position whereby the arm is firmly held in the first position extended forwardly from the back.

5. The armrest of claim 4 wherein the right-angle member has a first quadrant recess for accommodating the first stop and a second quadrant recess for accommodating the second stop.

6. The armrest of claim 5 wherein the right-angle member has an outwardly directed groove at one side of the first quadrant recess and an outwardly directed groove at one side of the second quadrant recess.

7. The armrest of claim 4 including biasing means for holding the right-angle member in engagement with the first member and second member.

8. The armrest of claim 1 including: a first stop on the first member to cooperate with a shoulder on the second member to hold the second member in a first position, and a second stop on the third member cooperating with a second shoulder on the second member to hold the third member in a position whereby the arm is held in the first position extended forwardly from the back.

9. The armrest of claim 8 wherein the second member has a first quadrant recess for accommodating the first stop and a second quadrant recess for accommodating the second stop.

10. The armrest of claim 1 including a first stop on the first member to cooperate with a portion of the second member to locate the second member in a first position, and coacting stop means between the third member and the second member to locate the third member in a position whereby the arm is held in a first position extended forwardly from the back.